United States Patent [19]
Lievre et al.

[11] Patent Number: 5,817,717
[45] Date of Patent: Oct. 6, 1998

[54] ABHERENT AND PRINTABLE, CROSSLINKABLE OR CROSSLINKED SILICONE COMPOSITION

[75] Inventors: André Lievre, Saint-Gents-Laval; Christian Mirou, Lyons, both of France

[73] Assignee: Rhone-Poulenc Chimie, Courbevoie Cedex, France

[21] Appl. No.: 483,698

[22] Filed: Jun. 7, 1995

[30] Foreign Application Priority Data

Jun. 7, 1994 [FR] France ................................. 94 07160

[51] Int. Cl.$^6$ ................................................. C08G 63/48
[52] U.S. Cl. ............................. 525/58; 525/100; 528/29
[58] Field of Search ......................... 525/58, 100; 528/29

[56] References Cited

U.S. PATENT DOCUMENTS 4,617,239  10/1986  Maruyama et al. .

FOREIGN PATENT DOCUMENTS

| 0 117 607 | 9/1984 | European Pat. Off. . |
|---|---|---|
| 0 169 098 | 1/1986 | European Pat. Off. . |
| 0 307 578 | 3/1989 | European Pat. Off. . |
| 0 385 342 | 9/1990 | European Pat. Off. . |
| 24 49 085 | 4/1976 | Germany . |

OTHER PUBLICATIONS

English Abstracts for 0 169 098, 24 49 085 and 0 307 578.
One–page French Search Report.

*Primary Examiner*—Melvyn I. Marquis
*Attorney, Agent, or Firm*—Burns, Doane, Swecker & Mathis, L.L.P.

[57] ABSTRACT

The present invention relates to crosslinkable or crosslinked silicone compositions capable of being employed especially for forming an abherent coating or film for a fibrous or other support, for example made of paper or the like, or made of natural or synthetic polymer (film). One of the essential objectives of the invention is to provide a crosslinkable or crosslinked silicone composition which provides a satisfactory solution to the abherence/printability dilemma, traditionally encountered in abherent silicone coatings. This objective and others are attained by the composition of the invention, including at least one polyorganosiloxane and at least one polyvinyl alcohol corresponding to the following specifications: ester value (E.V.) higher than or equal to 80, preferably 100 and still more preferably between 120 and 200, and standard dynamic viscosity ($\eta_{dt}$) lower than 12 mPa s and preferably lower than 10 mPa s, the dry weight ratio of the polyorganosiloxane fraction to the PVA fraction being established between 0.5 and 10, preferably between 1 and 5 and still more preferably between 1.5 and 3.5.

23 Claims, 3 Drawing Sheets

5,817,717

ABHERENT AND PRINTABLE, CROSSLINKABLE OR CROSSLINKED SILICONE COMPOSITION

BACKGROUND OF THE INVENTION

1. Field of the Invention

The field of the invention is that of crosslinkable or crosslinked silicone compositions capable of being employed especially for forming an abherent coating or film for a fibrous or other support, for example made of paper or the like, or made of natural or synthetic polymer (film).

2. Description of the Related Art

Polyorganosiloxanes are known for their ability to make abherent the surfaces of various supports (e.g. paper, fabric, polymer film or others). Abherent treatments are easy to perform with silicones because the latter can be in the form of a crosslinkable resin, solution or liquid emulsion, which can be easily applied and spread on to supports at an industrial rate and on an industrial scale. Thus, the silicone compositions are, for example, employed as demoulding agent, especially in the manufacture of tyres and in the injection moulding of plastics, or else for coating the metal moulds employed in patisseries or of nets in breadmaking ovens or, finally, for the production of adhesive-protecting paper (label, decorative paper), of interleaving paper for the handling of adhesive solids (laminate, raw rubber), and of abherent paper for the cooking of patisseries. By way of illustration it can be indicated that applications or patents U.S. Pat. No. 4,347,346, EP-A-0 219 720, EP-A-0 454 130 and EP-A-0 523 660 describe polyorganosiloxanes intended to be employed in the abherent paper application.

Known crosslinkable silicones employed for thin-layer coating of supports, e.g. paper, draw their abherent functionality partly from their water-repellent nature. However, this lack of affinity for water has the consequence that printing inks which, for the most part, are hydrophilic can neither bond to nor wet abherent silicone coatings.

To try and remedy this lack it has been proposed to incorporate into abherent silicone compositions additives and fillers that would be capable of making it possible to provide an answer, at the same time to the abherency requirement and the "printability" requirement. Thus, for example, patent application JP-A-0 503 3296 discloses paper-coating compositions containing polyorganosiloxanes, styrene-butadiene latex copolymers and pigments. The print qualities of such latex-filled silicone coatings still remain unsatisfactory. Furthermore, the addition of a latex filler introduces a heat sensitivity which is particularly handicapping for the coating. In fact, it results in a deterioration in the abherent properties at relatively low temperatures: the coated support becomes thermoadhesive.

SUMMARY OF THE INVENTION

In this state of the art one of the essential objectives of the present invention is to overcome the abovementioned disadvantages by providing a crosslinkable or crosslinked silicone composition which provides a satisfactory solution to the abherence/printability dilemma, traditionally encountered in abherent silicone coatings.

Another objective of the invention is to provide a crosslinkable or crosslinked silicone composition capable of forming an abherent and printable coating which is not heat-sensitive.

Another objective of the invention is to provide a crosslinkable or crosslinked silicone composition capable of forming an abherent and printable coating which is also water-repellent and which not only has good water resistance but also good resistance to fats.

Another objective of the invention is to provide a crosslinkable or crosslinked silicone composition for abherent and printable coating, which can be easily applied, for example by spreading, onto the supports to be treated, so as to satisfy the industrial constraints of profitability and mass production.

Another objective of the invention is to provide a crosslinkable or crosslinked silicone composition for printable abherent coating at a reasonable cost of manufacture.

Another objective of the invention is to provide supports treated with the aid of the abovementioned compositions.

To attain these objectives, among others, the Applicant Company has, to its credit, demonstrated, after numerous investigations and tests, that the solution to the abovementioned problems is provided by the incorporation into the crosslinkable or crosslinked silicone composition in question of an additive of the water-soluble polymer type chosen from a particular class of polyvinyl alcohols.

DESCRIPTION OF THE PREFERRED EMBODIMENTS

Figure 1:
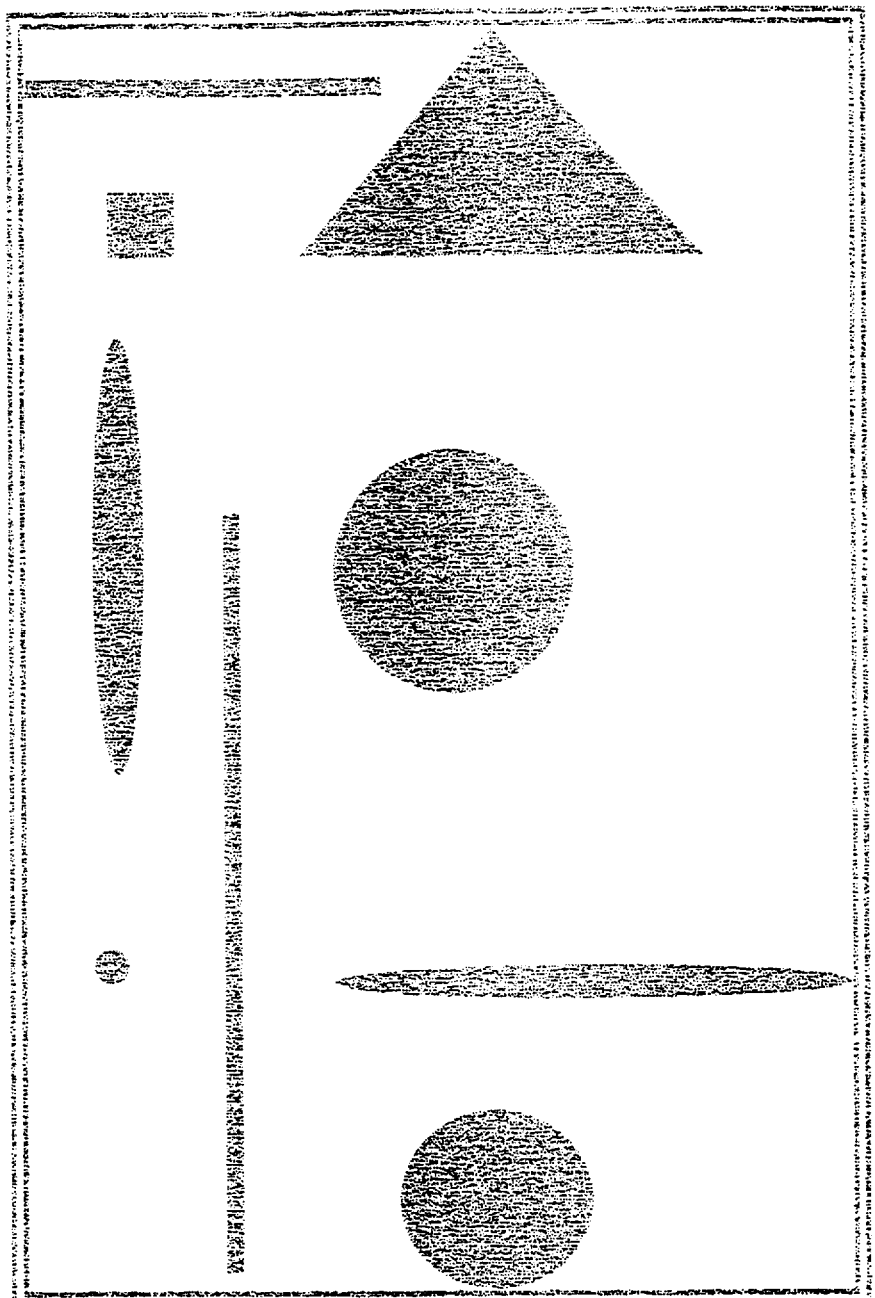
FIG. 1 is a standard illustrating mediocre printability.

Thus, the present application therefore relates, first of all, to a crosslinkable silicone composition capable of being employed as abherent and printable coating for a fibrous or other support, of the type of those including at least one polyorganosiloxane and at least one polyvinyl alcohol ($PVA_1$) which has an ester value (E.V.) higher than or equal to 80, preferably 100 and still more preferably between 120 and 200, characterized in that this $PVA_1$ exhibits a standard dynamic viscosity ($\eta_{dt}$) lower than 12 mPa s and preferably lower than 10 mPa s, and in that the dry weight ratio of the polyorganosiloxane fraction to the PVA fraction is established between 0.5 and 10, preferably between 1 and 5 and still more preferably between 1.5 and 3.5, with the condition according to which the $PVA_1$ is mixed with at least one other polyvinyl alcohol in the case where the polyorganosiloxane fraction contains at least one polydiorganosiloxane carrying at each end of the chain at least two condensable or hydrolysable groups or a single hydroxyl group, the molecules of the said polydiorganosiloxane(s) being capable of reacting with each other and/or with those of at least one crosslinking agent of organosilane type, containing at least three condensable or hydrolysable groups when the polydiorganosiloxane is at hydroxyl ends and/or of polyhydrosiloxane type, in the presence of a catalyst system including a catalytically effective quantity of at least one catalyst composed of at least one metal belonging to the tin group, and according to a polycondensation mechanism.

Polyvinyl alcohols (PVA) are compounds obtained indirectly from their esters by hydrolysis in aqueous medium or by alcoholysis in anhydrous medium. In practice the esters employed as raw material are commonly polyvinyl acetates. The lysis of the esters which produces the PVAs is generally not complete. Acyl radicals remain in the molecule and their proportion affects the properties of the PVA, especially its solubility. A method of defining the PVAs is therefore based on the indication of the ester value (E.V.), which is inversely proportional to the degree of hydrolysis. The measurement of the E.V. is performed in a manner known per se, by neutralization of the possible acidity of the polyvinyl alcohol, saponification of the acyl groups and titration of the excess alkaline saponification.

The polyvinyl alcohols according to the invention are also characterized by their degree of condensation, which can be evaluated by determining the dynamic viscosity of a standard solution (denoted by $\eta_{dt}$ in the present description), it being known that this variable is proportionally higher the greater the degree of condensation.

The viscosity $\eta_{dt}$ corresponds to the dynamic viscosity coefficient of an aqueous solution of PVA at a concentration of 4% by weight, measured at a temperature of 20°±5° C. with the aid of a Ostwald viscometer.

The compositions according to the invention make it possible to obtain, after coating, printable and water-repellent abherent surfaces. In addition, the crosslinked coatings thus produced are relatively insensitive to temperature.

Furthermore, they have the benefit of good printability and satisfactory abherence. Finally, the polyvinyl alcohol used does not overburden the silicone composition where economics are concerned.

Without any limitation being intended, examples may be given of polyvinyl alcohols which give satisfactory results with regard to the objectives aimed at by the invention: these PVAs are those whose $\eta_{dt}$ is between 5 and 10 mPa s and whose E.V. is between 130 and 150.

The polyvinyl acetates are conventional PVAs usable for the invention.

According to an advantageous alternative form of the invention the composition contains a mixture of different polyvinyl alcohols, preferably a mixture of polyvinyl alcohols as defined above (PVA$_1$) and of polyvinyl alcohols (PVA$_2$) whose E.V. is higher than or equal to 10, preferably between 10 and 150 and still more preferably between 15 and 50, and whose $\eta_{dt}$ is lower than or equal to 50 mPa s, preferably 30 mPa s and still more preferably 10 mPa s. The proportions of PVA$_1$ and PVA$_2$ in the mixture are advantageously the following:

PVA$_1$ from 40 to 100 parts by weight, preferably from 50 to 100 parts by weight;

PVA$_2$ from 0 to 60 parts by weight, preferably from 0 to 50 parts by weight.

Such an alternative form makes it possible to obtain a good compromise between the resistance to fats and the water resistance, without any loss in the abherence and in the printability.

As follows from the above, the silicone composition according to the invention includes, inter alia, a polyorganosiloxane fraction and a polyvinyl alcohol fraction.

In the context of the invention it has appeared to be preferable that the dry weight ratio $$\frac{\text{polyorganosiloxane fraction}}{\text{PVA fraction}}$$

should be established between 0.5 and 10, preferably between 1 and 5 and still more preferably between 1.5 and 3.5.

With regard to the polyorganosiloxane fraction, this may consist of one polymer or a mixture of crosslinkable silicone polymers of any appropriate kind and known per se, especially for applications in abherence and/or water-repellency.

This polyorganosiloxane fraction may thus consist, for example, of at least one of the fractions a, b and c described below.

The polyorganosiloxane fraction *a* includes at least one polydiorganosiloxane carrying at each end of the chain at least two condensable or hydrolysable groups or a single hydroxyl group, the molecules of the said polydiorganosiloxane(s) being capable of reacting with each other and/or with those of at least one crosslinking agent of organosiloxane type containing at least three condensable or hydrolysable groups when the polydiorganosiloxane has hydroxyl ends and/or of polyhydrosiloxane type, in the presence of a catalyst system including a catalytically effective quantity of at least one catalyst composed of at least one metal belonging to the tin group, and according to a polycondensation mechanism.

More precisely, these polyorganosiloxanes of the polycondensation type may be obtained from, e.g., α,ω-dihydroxylated diorganopolysiloxanes and hydrogenated diorganopolysiloxanes.

The polyorganosiloxane fraction *b* consists especially of at least one polyorganosiloxane which is cationically crosslinkable by virtue of functional substituents, preferably of epoxy and/or vinyloxy type.

Such silicones are of the type of those defined in French patent applications, in the name of the Applicant Company, Nos. 92 03 441 and 93 02749, which are included by reference in the present specification, for the description of the cationically crosslinkable polyorganosiloxanes.

Another example of polyorganosiloxane fraction which corresponds to an advantageous use of the invention is given by the fraction *c*, consisting especially of:

at least one polyorganosiloxane (I) containing, per molecule, at least two C$_2$–C$_6$ alkenyl groups bonded to silicon, at least one polyorganosiloxane (II) containing, per molecule, at least three hydrogen atoms bonded to silicon, and of a catalyst system including a catalytically effective quantity of at least one catalyst (III) consisting of at least one metal belonging to the platinum group, these polyorganosiloxanes being crosslinkable by polyaddition.

In terms of weight, the polyorganosiloxane (I) is one of the essential constituents of the composition according to the invention. It is advantageously a product containing units of formula:

$$T_a Z_b \text{SiO}_{\frac{4-(a+b)}{2}} \qquad (\text{I.1})$$

in which:

T is an alkenyl, preferably vinyl or alkyl, group,

Z is a monovalent hydrocarbon group free from unfavourable effect on the activity of the catalyst and preferably chosen from alkyl groups containing from 1 to 8 carbon atoms inclusive, advantageously from methyl, ethyl, propyl and 3,3,3-trifluoropropyl groups, as well as from aryl groups and, advantageously, from xylyl and tolyl and phenyl radicals, a is 1 or 2, b is 0, 1 or 2 and a+b is between 1 and 3, optionally at least a part of the other units are units of average formula:

$$Z_cSiO_{\frac{4-c}{2}} \quad (I.2)$$

in which Z has the same meaning as above and c has a value of between 0 and 3, for example between 1 and 3.

It is advantageous that this polydiorganosiloxane should have a viscosity of at least 10 mPa s, preferably at least 1000 mPa s and still more preferably between 5,000 and 200,000 mPa s. Polydimethylsiloxane may be mentioned by way of example of compound (I).

The polyorganosiloxane (I) may be formed solely of units of formula (I.1) or may, in addition, contain units of formula (I.2). Similarly, it may have a cyclic, branched, linear or network structure. Its degree of polymerization is preferably between 2 and 5,000.

Z is generally chosen from methyl, ethyl and phenyl radicals, at least 60 mol % of the radicals Z being methyl radicals.

Examples of siloxy units of formula (I.1) are the vinyldimethylsiloxane unit, the vinylphenylmethylsiloxane unit and the vinylsiloxane unit.

Examples of siloxy units of formula (I.2) are $SiO_{4/2}$, dimethylsiloxane, methylphenylsiloxane, diphenylsiloxane, methylsiloxane and phenylsiloxane units.

Examples of polyorganosiloxanes (I) are dimethylpolysiloxanes with dimethylvinylsilyl ends, methylvinyldimethylpolysiloxane copolymers with trimethylsilyl ends, methylvinyldimethylpolysiloxane copolymers with dimethylvinylsilyl ends, and cyclic methylvinylpolysiloxanes.

The polyorganosiloxane (II) is preferably of the type of those containing siloxy units of formula:

$$H_aL_eSiO_{\frac{4-(d+e)}{2}} \quad (II.1)$$

in which:

L is a monovalent hydrocarbon group free from unfavourable effect on the activity of the catalyst and preferably chosen from alkyl groups containing from 1 to 8 carbon atoms inclusive and, advantageously, from methyl, ethyl, propyl and 3,3,3-trifluoropropyl groups, as well as from aryl groups and, advantageously, from xylyl and tolyl and phenyl radicals, d is 1 or 2, e is 0, 1 or 2, d+e has a value between 1 and 3, optionally, at least a part of the other units being units of average formula:

$$L_gSiO_{\frac{4-g}{2}} \quad (II.2)$$

in which L has the same meaning as above and g has a value between 0 and 3.

The dynamic viscosity $\eta_d$ of this polyorganosiloxane (II)≧5, preferably 10, and, still more preferably, is between 20 and 1000 mPa s.

By way of examples of polyorganosiloxane (II) there may be mentioned the poly(dimethylsiloxane) α,ω-(methylhydrosiloxy)dimethylhydrosiloxane.

The polyorganosiloxane (II) may be formed solely of units of formula (II.1) or may additionally contain units of formula (II.2).

The polyorganosiloxane (II) may have a cyclic, branched, linear or network structure. The degree of polymerization is higher than or equal to 2. It is more generally lower than 5000.

Group L has the same meaning as group Z above.

Examples of units of formula (II.1) are:

$H(CH_3)_2SiO_{1,2}, HCH_3SiO_{2,2}, H(C_6H_5)SiO_{2,2}$

Examples of units of formula (II.2) are the same as those given above for the units of formula (I.2).

Examples of polyorganosiloxane (II) are:

dimethylpolysiloxanes with hydrodimethylsilyl ends, copolymers containing dimethylhydromethylpolysiloxane (dimethyl) units with trimethylsilyl ends, copolymers containing dimethylhydromethylpolysiloxane units with hydrodimethylsilyl ends, hydromethylpolysiloxanes with trimethylsilyl ends, cyclic hydromethylpolysiloxanes.

The ratio of the number of hydrogen atoms bonded to silicon in the polyorganosiloxane (I) to the number of groups containing alkenyl unsaturation in the polyorganosiloxane (2) is between 0.4 and 10, preferably between 0.6 and 5.

The bases of polyaddition silicone compositions may contain only linear polyorganosiloxanes (I) and (II) as, for example, those described in patents: U.S. Pat. Nos. 3,220,972, 3,697,473 and 4,340,709, or may contain at the same time polyorganosiloxanes (I) and (II) which are branched or as a network, as, for example, those described in patents: U.S. Pat. Nos. 3,284,406 and 3,434,366.

The catalysts (III) are also well known. Platinum and rhodium compounds are preferably employed. It is possible, in particular, to employ complexes of platinum and of an organic product described in U.S. Pat. Nos. 3,159,601, 3,159,602, 3,220,972 and European patents EP-A-0 057 459, EP-A-0 188 978 and EP-A-0 190 530 and complexes of platinum and of vinylated organosiloxanes described in U.S. Pat. Nos. 3,419,593, 3,715,334, 3,377,432 and 3,814,730. Platinum is the catalyst generally preferred. In this case the weight quantity of catalyst (III), calculated as weight of platinum metal, is generally between 2 and 400 ppm, preferably between 5 and 200 ppm, based on the total weight of the polyorganosiloxanes (I) and (II).

The catalyst system of this silicone elastomer composition of polyaddition type advantageously includes at least one retardant of the addition reaction (crosslinking inhibitor), chosen from the following compounds:

polyorganosiloxanes, advantageously cyclic and substituted by at least one alkenyl, tetramethylvinyltetrasiloxane being particularly preferred, pyridine, phosphines and organic phosphites, unsaturated amides, alkyl maleates and acetylenic alcohols.

These acetylenic alcohols (cf. FR-B-1 528 464 and FR-A-2 372 874), which form part of the preferred thermal blockers of a hydrosilylation reaction, have the formula:

R—(R')C(OH)—C≡CH in which formula

R is a linear or branched alkyl radical or a phenyl radical,

R' is H or a linear or branched alkyl radical or a phenyl radical, it being possible for the radicals R, R' and the carbon atom situated α to the triple bond to optionally form a ring, the total number of carbon atoms contained in R and R' being at least 5, preferably from 9 to 20.

The said alcohols are preferably chosen from those which have a boiling point higher than 250° C. By way of examples there may be mentioned:

1-ethynyl-1-cyclohexanol,
3-methyl-1-dodecyn-3-ol,
3,7,11-trimethyl-1-dodecyn-3-ol,
1,1-diphenyl-2-propyn-1-ol,
3,6-diethyl-1-nonyn-3-ol,
3-methyl-1-pentadecyn-3-ol.

These α-acetylenic alcohols are commercial products.

Such a retardant is present in a proportion of at most 3000 ppm, preferably in a proportion of 100 to 2000 ppm relative to the total weight of the organopolysiloxanes (I) and (II).

The composition according to the invention is advantageously in the form of a crosslinkable aqueous dispersion including:
the polyorganosiloxane fraction consisting of an emulsion of the oil-in-water type, optionally stabilized with at least one surfactant chosen from ionic or nonionic surfactants and mixtures thereof,
the water-soluble polymer fraction,
a catalyst system for crosslinking,
optionally an inorganic filler, and
optionally at least one antifoaming agent.

The optional inorganic filler is preferably mineral. It may consist of products chosen from siliceous or other substances.

Where siliceous substances are concerned, these can act as a reinforcing or semireinforcing filler.

The reinforcing siliceous fillers are chosen from colloidal silicas, pyrogenic and precipitated silica powders or a mixture thereof.

These powders have a mean particle size which is generally smaller than 0.1 $\mu$m and a BET specific surface higher than 50 m$^2$/g, preferably between 150 and 350 m$^2$/g.

Semireinforcing siliceous fillers such as diatomaceous earths or ground quartz may also be employed.

With regard to nonsiliceous organic fillers, these may be involved as a semireinforcing or packing inorganic filler. Examples of these nonsiliceous fillers which can be employed by themselves or mixed are carbon black, titanium dioxide, aluminium oxide, alumina hydrate, expanded vermiculite, unexpanded vermiculite, calcium carbonate, zinc oxide, mica, talc, iron oxide, barium sulphate and slaked lime. These fillers have a particle size which is generally between 0.001 and 300 $\mu$m and a BET surface lower than 100 m$^2$/g.

Where weight is concerned, it is preferred to use a quantity of filler of between 20 and 50, preferably between 25 and 35% by weight relative to the combination of the constituents of the composition.

The antifoaming agent optionally added to the composition is selected, e.g., from the silicone-based antifoams such as Rhodorseal® 70414 marketed by the Applicant.

Advantageously a coadditive of latex type is provided for, which is introduced in the water-soluble polymer fraction in order to act in combination with the latter. Styrene-butadiene copolymers may be mentioned as an example of latex which may be suitable.

According to an advantageous arrangement of the invention the proportion of water in the abovementioned aqueous dispersion is higher than or equal to 50% by weight, preferably 70% by weight and still more preferably 90% by weight.

In a manner known per se, the silicone elastomer composition may also have various conventional additives added to it, such as, for example, colorants.

According to another of these aspects and in the case where the polyorganosiloxanes used are of the polyaddition type, the present invention relates to an at least two-component precursor system of the elastomer silicone composition described above. In this system the crosslinkable reactive parts of the silicone composition are not present. Such a precursor system is advantageously in two separate parts A and B, which are intended to be mixed to form the composition, one of these parts A or B including the catalyst system (III) and a single species (I) or (II) of polyorganosiloxane.

Thus, this two-component system consists:
either of a part A including the polyorganosiloxane fraction mixed with the water-soluble polymer fraction and a part B including the catalyst system optionally supplemented by a part of the polyorganosiloxane fraction which is not reactive by itself in the presence of the catalyst system,
or of a part A including the polyorganosiloxane fraction as all or part and of a part B formed by the water-soluble polymer fraction and the catalyst system and optionally supplemented by a part of the polyorganosiloxane fraction which is not reactive by itself in the presence of the catalyst system.

To obtain the crosslinkable aqueous silicone dispersion of the invention, an aqueous emulsion is prepared first of all from the polyorganosiloxane fraction and water. This emulsion is next mixed with the water-soluble polymer fraction and, just before applying the dispersion to the surface of the support to be coated, with the catalyst system, so as to start off the crosslinking system which continues during and after the coating.

Electron beams and electromagnetic (UV) or heat (IR) radiations constitute means, among others, capable of being used for initiating and/or promoting the crosslinking.

Another subject of the invention is the use of the elastomer composition or of its precursor system described above for the coating or spreading of fibrous or other support, preferably fibrous and still more preferably supports made of paper or the like, this coating being present in a proportion of not more than 1.00 g of polyorganosiloxane per m$^2$ of support, preferably not more than 0.9 g/m$^2$ and still more preferably not more than 0.50 g/m$^2$.

According to other alternatives this support may consist of synthetic or natural polymers such as polyethylenes, polypropylenes or polyesters.

The support may be in the form of thin film (layer), of fabric or of other flexible articles, as well as in the form of more compact and bulky objects (e.g. moulds etc.).

According to a preferred application of the composition of the invention the fibrous or other support includes on at least one of its faces an abherent and printable coating consisting of the silicone composition in crosslinked form, as described above.

More precisely, this support may comprise the abherent and printable coating on one of its faces and an adhesive coating on the opposite face. In this embodiment are envisaged in particular articles such as labels, self-adhesive sheets, tapes or the like, which have the properties of being printable, water-repellent and capable of adhesively bonding one over the other, in a reversible manner. This last characteristic is particularly advantageous for self-adhesive labels, because it makes it possible to eliminate the conventional abherent supports.

It is obvious that the invention is not limited to the supports with adhesive/abherent opposite faces but also includes supports coated only with one layer of printable abherent, which supports may be printed and employed as such, for example, as means of protection.

Another subject of the invention is the use of polyvinyl alcohols as an agent for improving the printability of a crosslinkable or crosslinked silicone composition intended to be employed for forming an abherent and printable coating for fibrous or other supports, preferably made of paper or synthetic polymer.

The examples, which follow, of preparation of the silicone composition in question and of its application as abherent, printable and water-repellent coating for paper supports will make it possible to understand the invention better and to emphasize its advantages and its alternative forms of embodiment. The performance of the composition of the invention will be additionally commented upon using comparative tests.

EXAMPLES

Example 1

Preparation of Aqueous Silicone Coating Dispersions According to the Invention

The following are charged into a reactor fitted with a propeller stirrer:

A. 100 parts by weight:
- of an aqueous emulsion (solids content=40% by weight) prepared in a manner known per se from a polydimethylsiloxane oil (I) containing 1% by weight of vinyl units, and from a polyhydromethylsiloxane oil (II) containing 30% by weight of SiH units (SiH/SiVi molar ratio≧1),
- of 2 g of an emulsifying polyvinyl alcohol of given ester value and viscosity $\eta_{dt}$, and
- water.

B. 12 parts by weight of a Karstedt type platinum catalyst (the ratio of Pt metal to the silicone oils is of the order of 100 ppm).

A and B are mixed by stirring for 5 minutes and 190 parts by weight of an aqueous solution containing 10% by weight of polyvinyl alcohol are added gradually.

1929 parts of water are next added so as to obtain a solids content of approximately 3% by weight.

A number of samples of silicone coating composition were thus obtained: negative control (C) without water-soluble polymer and samples 1 to 8, differing from each other, according to the nature of the PVA and the deposition density.

Three types of PVA were used:

$PVA_0$ $\eta_{dt}$=30/E.V.=5
$PVA_1$ $\eta_{dt}$=5/E.V.=140
$PVA_2$ $\eta_{dt}$=8/E.V.=20

These PVAs are products of Rhodoviol® trademark, marketed by the Applicant Company.

Example 2

Application of the Dispersions of Example 1 to Paper Supports

The coating was carried out cold with the aid of a Romotec pilot machine equipped with a coating head of "Meyer bar" type.

After coating, the crosslinking is performed by a pass through an oven of 3×2 m length, controlled at 150° C.

Since the machine speed is 50 m/min, the silicone coating crosslinks for 7.2 s in the oven. The surface temperature of the paper is approximately 110° C.

The treated papers are tested after aging for 9 days in a room controlled at 23° C. and 50% RH.

The bleached craft paper used has a width of 400 mm and a weight per unit area of 50 g/m².

Example 3

Tests on Papers from Example 2

3.1 Analytical methods

Figure 2:
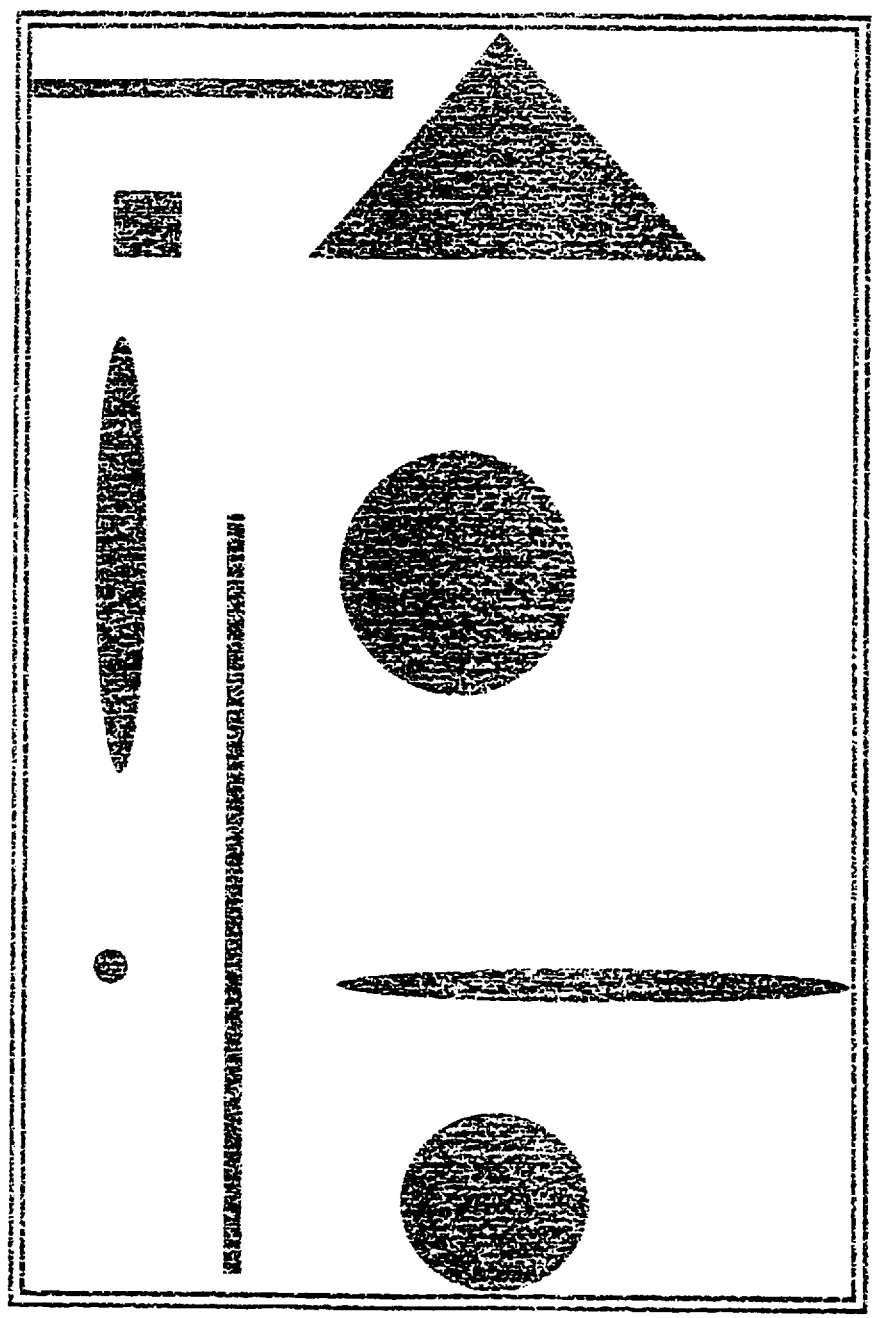
FIG. 2 is a standard illustrating average printability.
Figure 3:
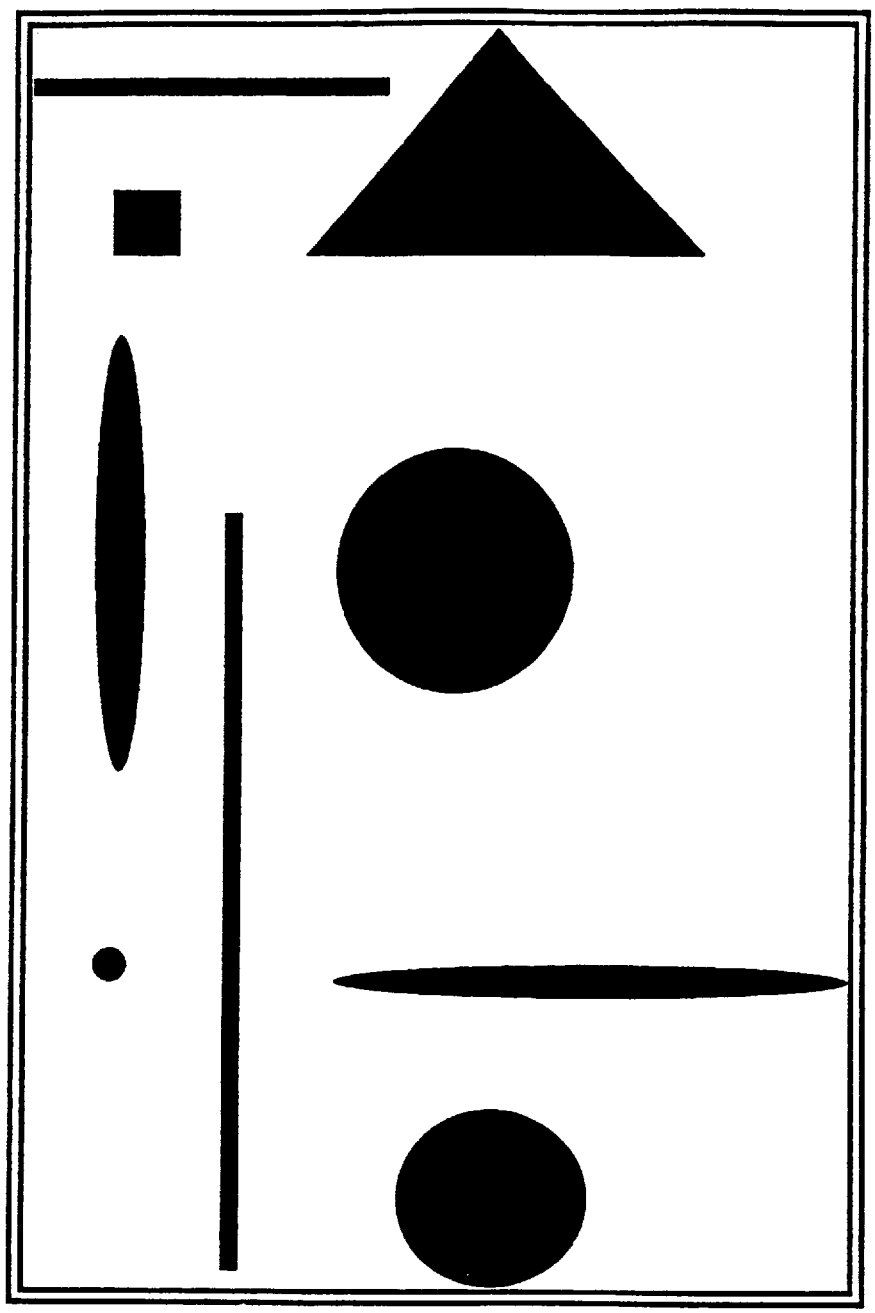
FIG. 3 is a standard illustrating excellent printability.

- the total surface silicone deposit is measured by X-ray fluorescence and is expressed in g of dry polyorganosiloxane deposited per m² of paper.
- the abherence of the silicone coatings is evaluated by measuring the forces of peeling off an adhesive tape of Tesa® 4651 trademark, with the aid of a tensometer of Instron type, according to Finat method No. 3. The forces are expressed in gf/cm. In this test the abherence is acceptable if it is ≦500 gf, which corresponds to: + and good if it is ≦200 gf, which corresponds to: ++.
- the printability was evaluated with the aid of a printer of "ink jet" type of Hewlett Packard Deskjet Plus® 500 trademark. The printability is assessed according to a range of three standards corresponding to the attached FIGS. 1 to 3:
  FIG. 1=mediocre, marked −
  FIG. 2=average, marked +
  FIG. 3=excellent, marked ++

3.2. Test conditions and results Cf. table below.

|  | Samples | | | | | | | | |
|---|---|---|---|---|---|---|---|---|---|
|  | C | 1 | 2 | 3 | 4 | 5 | 6 | 7 | 8 |
| FORMULATION (in parts by weight) | | | | | | | | | |
| Emulsion of polyorganosiloxanes (I) and (II) | 100 | 100 | 100 | 100 | 100 | 100 | 100 | 100 | 100 |
| Catalyst system (III) | 12 | 12 | 12 | 12 | 12 | 12 | 12 | 12 | 12 |
| water | 1000 | 1000 | 1000 | 1000 | 1000 | 1000 | 1000 | 1000 | 1000 |
| $PVA_0$ 30/5 |  | 19 | 19 | 19 |  |  |  |  |  |
| $PVA_1$ 5/140 | 0 | 0 | 0 | 0 | 19 | 19 | 19 | 19 | 19 |
| $PVA_2$ 8/20 | 0 | 0 | 0 | 0 | 0 | 0 | 0 | 19 | 19 |
| Rate of deposition in g of polyorganosiloxane fraction/m² of paper | 0.30 | 0.55 | 0.42 | 0.20 | 0.84 | 0.54 | 0.28 | 0.51 | 0.23 |

-continued

| | Samples | | | | | | | |
|---|---|---|---|---|---|---|---|---|
| | C | 1 | 2 | 3 | 4 | 5 | 6 | 7 | 8 |
| ABHERENCE gf/cm | ++ | ++ | ++ | ++ | ++ | ++ | ++ | + | + |
| PRINTABILITY | − | − | − | − | + | ++ | ++ | + | ++ |

We claim:

1. A cross-linkable or crosslinked silicone composition capable of being employed for forming an abherent and printable coating for fibrous or other supports, comprising
at least one polyorganosiloxane fraction *b* or at least one polyorganosiloxane fraction *c* or mixtures thereof, wherein said polyorganosiloxane fraction *b* comprises at least one polyorganosiloxane which is cationically crosslinkable by virtue of functional substituents; and said polyorganosiloxane fractions *c* comprises at least one polyorganosiloxane comprising, per molecule, at least two $C_2$–$C_6$ alkenyl groups bonded to silicon, and at least one polyorganosiloxane comprising, per molecule, at least three hydrogen atoms bonded to silicon; wherein said polyorganosiloxanes are crosslinkable by polyaddition; and said fraction *c* is formed by a catalyst system comprising a catalytically effective amount of at least one catalyst which comprises at least one metal belonging to the platinum group; and,
a polyvinyl alcohol fraction comprising at least one polyvinyl alcohol ($PVA_1$) which has an ester value higher than or equal to 80 and exhibits a standard dynamic viscosity lower than 12 mPa s.

2. The composition of claim 1, wherein said $PVA_1$ has an ester value higher than or equal to 100.

3. The composition of claim 1, wherein said wherein said $PVA_1$ has a standard dynamic viscosity lower than 10 mPa s.

4. The composition of claim 1, wherein said dry weight ratio is between 1 and 5.

5. The composition of claim 1, wherein said polyvinyl alcohol fraction comprises a mixture of polyvinyl alcohols.

6. The composition of claim 5, wherein said mixture of polyvinyl alcohols comprises
$PVA_1$; and
at least one other polyvinyl alcohol ($PVA_2$) which has an ester value higher than or equal to 10 and exhibits a standard dynamic viscosity lower than or equal to 50 mPa s.

7. The composition of claim 6, wherein said $PVA_2$ has an ester value between 10 and 150.

8. The composition of claim 6, wherein said $PVA_2$ has an ester value between 15 and 50 and a standard dynamic viscosity of lower than or equal to 30 mPa s.

9. The composition of claim 1, wherein said functional substituents are of the epoxy and/or vinyloxy type.

10. The composition of claim 1, wherein said composition is in the form of a cross-linkable aqueous dispersion comprising said polyorganosiloxane fraction in the form of an emulsion of the oil-in-water type, a water-soluble polymer fraction and a catalyst system for crosslinking.

11. The composition of claim 10, wherein said polyorganosiloxane fraction in the form of the oil-in-water type is stabilized with at least one surfactant selected from the group consisting of ionic surfactants, nonionic surfactants and mixtures thereof.

12. The composition of claim 10, wherein said dispersion further comprises an inorganic filler.

13. The composition of claim 10, wherein said dispersion further comprises at least one antifoaming agent.

14. The composition of claim 10, wherein the proportion of water is higher than or equal to 50% by weight.

15. A precursor system comprising at least two components of the composition of claim 1, wherein said silicone composition is free of crosslinkable reactive parts.

16. A method for producing an abherent and printable coating on a fibrous or other support comprising applying a coating comprising the composition of claim 1 to said fibrous or other support, wherein said coating is applied in a proportion of not more than 1.00 g of polyorganosiloxane per $m^2$ of support.

17. The method of claim 16, wherein said fibrous or other support is made of paper.

18. The method of claim 16, wherein said coating is applied in a proportion of not more than 0.50 g of polyorganosiloxane per $m^2$ of support.

19. A method for producing an abherent and printable coating on a fibrous or other support comprising applying a coating comprising the precursor system of claim 15 to said fibrous or other support, wherein said coating is applied in a proportion of not more than 1.00 g of polyorganosiloxane per $m^2$ of support.

20. A fibrous or other support comprising, on at least one face of said fibrous or other support, a coating comprising the abherent and printable silicone composition of claim 1, wherein said composition is in crosslinked form.

21. The fibrous or other support of claim 20, wherein said fibrous or other support is made of paper.

22. The fibrous or other support of claim 20, wherein one of the faces of said fibrous or other support is coated with said abherent and printable silicone composition and the opposite face is coated with an adhesive.

23. A method for improving the printability of a crosslinkable or crosslinked silicone composition intended to be employed for forming an abherent and printable coating for fibrous or other supports comprising, adding to said silicone composition;
at least one polyorganosiloxane fraction *b* or at least one polyorganosiloxane fraction *c* or mixtures thereof, wherein said polyorganosiloxane fraction *b* comprises at least one polyorganosiloxane which is cationically crosslinkable by virtue of functional substituents; and said polyorganosiloxane fractions *c* comprises at least one polyorganosiloxane comprising, per molecule, at least two $C_2$ –$C_6$ alkenyl groups bonded to silicon, and at least one polyorganosiloxane comprising, per molecule, at least three hydrogen atoms bonded to silicon; wherein said polyorganosiloxanes are crosslinkable by polyaddition; and said fraction *c* is formed by a catalyst system comprising a catalytically effective amount of at least one catalyst which comprises at least one metal belonging to the platinum group; and,
a polyvinyl alcohol fraction comprising at least one polyvinyl alcohol ($PVA_1$) which has an ester value higher than or equal to 80 and exhibits a standard dynamic viscosity lower than 12 mPa s.

* * * * *